(12) United States Patent
Baron et al.

(10) Patent No.: US 8,307,411 B2
(45) Date of Patent: Nov. 6, 2012

(54) GENERIC FRAMEWORK FOR EAP

(75) Inventors: Andrew Baron, Redmond, WA (US); Taroon Mandhana, Redmond, WA (US); Saurabh Mahajan, Redmond, WA (US); Prashant Malik, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 951 days.

(21) Appl. No.: 11/704,624

(22) Filed: Feb. 9, 2007

(65) Prior Publication Data
US 2008/0196089 A1    Aug. 14, 2008

(51) Int. Cl.
H04L 29/06    (2006.01)

(52) U.S. Cl. ........................................... 726/5

(58) Field of Classification Search .................. 726/5–8, 726/15–21; 713/155–158
See application file for complete search history.

(56) References Cited

U.S. PATENT DOCUMENTS

| | | | |
|---|---|---|---|
| 5,345,594 A | 9/1994 | Tsuda | |
| 6,161,139 A | 12/2000 | Win | |
| 6,182,142 B1 | 1/2001 | Win | |
| 6,636,966 B1 | 10/2003 | Lee | |
| 6,668,322 B1 | 12/2003 | Wood | |
| 6,807,569 B1 | 10/2004 | Bhimani | |
| 6,845,395 B1 | 1/2005 | Blumenau | |
| 6,862,699 B2 | 3/2005 | Nakashima | |
| 6,892,307 B1 | 5/2005 | Wood | |
| 6,907,546 B1 | 6/2005 | Haswell | |
| 6,912,522 B2 | 6/2005 | Edgar | |
| 6,944,761 B2 | 9/2005 | Wood | |
| 6,970,869 B1 | 11/2005 | Slaughter et al. | |
| 6,983,381 B2 | 1/2006 | Jerdonek | |
| 6,996,714 B1 * | 2/2006 | Halasz et al. | 713/163 |
| 7,035,442 B2 | 4/2006 | Ha | |
| 7,058,696 B1 | 6/2006 | Phillips | |
| 7,069,437 B2 | 6/2006 | Williams | |
| 7,085,840 B2 | 8/2006 | de Jong | |
| 7,085,931 B1 | 8/2006 | Smith | |
| 7,103,772 B2 | 9/2006 | Jorgensen | |

(Continued)

FOREIGN PATENT DOCUMENTS
WO    WO 0182037    2/2001

(Continued)

OTHER PUBLICATIONS

Andy Rathbone, "Windows XP for Dummies", 2001, Wiley Publishing inc. 909 Third Ave, Yew York, NY 10022, pp. 63-64.*

(Continued)

Primary Examiner — Gilberto Barron, Jr.
Assistant Examiner — Simon Kanaan
(74) Attorney, Agent, or Firm — Workman Nydegger

(57) ABSTRACT

An EAP-based authentication framework is provided that decouples credential acquisition from EAP methods that use credentials for authentication. An application may request from an EAP method parameters of credentials required by the EAP method. In response, the EAP method provides credential parameters, which may then be used by the application to acquire credentials consistent with the parameters from the user or other entity. The framework enables an application to request credentials in a context specific way. In addition, the application may simultaneously obtain credentials used in multiple authentication operations through a single user interface, or retain credentials for later use without further prompting a user such that a Single Sign-on user experience may be implemented. Additionally, the application can obtain credentials from a device so that the device may gain network access without requiring a user logon.

14 Claims, 6 Drawing Sheets

U.S. PATENT DOCUMENTS

| | | |
|---|---|---|
| 7,114,080 B2 | 9/2006 | Rahman |
| 7,158,777 B2 | 1/2007 | Lee |
| 7,181,762 B2 | 2/2007 | Jerdonek |
| 7,275,156 B2 | 9/2007 | Balfanz |
| 7,275,157 B2 | 9/2007 | Winget |
| 7,458,095 B2 | 11/2008 | Forsberg |
| 7,549,048 B2 | 6/2009 | Freeman |
| 2002/0059545 A1 | 5/2002 | Nakashima |
| 2002/0087857 A1 | 7/2002 | Tsao |
| 2002/0095569 A1 | 7/2002 | Jerdonek |
| 2002/0116611 A1 | 8/2002 | Zhou |
| 2002/0161826 A1 | 10/2002 | Arteaga |
| 2003/0005117 A1 | 1/2003 | Kang |
| 2003/0041244 A1 | 2/2003 | Buttyan |
| 2003/0055962 A1 | 3/2003 | Freund |
| 2003/0055974 A1 | 3/2003 | Brophy |
| 2003/0056096 A1 | 3/2003 | Albert et al. |
| 2003/0084293 A1 | 5/2003 | Arkko |
| 2003/0090998 A1 | 5/2003 | Lee |
| 2003/0093676 A1 | 5/2003 | Kawamura |
| 2003/0115324 A1 | 6/2003 | Blumenau |
| 2003/0169883 A1 | 9/2003 | Leroux |
| 2003/0172090 A1 | 9/2003 | Asunmaa |
| 2003/0177351 A1 | 9/2003 | Skingle |
| 2003/0177390 A1 | 9/2003 | Radhakrishnan |
| 2003/0226017 A1 | 12/2003 | Palekar |
| 2003/0226036 A1 | 12/2003 | Bivens et al. |
| 2004/0088582 A1 | 5/2004 | Hovmark |
| 2004/0098588 A1 | 5/2004 | Ohba |
| 2004/0107360 A1 | 6/2004 | Herrmann |
| 2004/0117818 A1 | 6/2004 | Karaoguz |
| 2004/0122956 A1 | 6/2004 | Myers |
| 2005/0005098 A1* | 1/2005 | Michaelis et al. ............ 713/156 |
| 2005/0015490 A1 | 1/2005 | Saare et al. |
| 2005/0015588 A1 | 1/2005 | Lin |
| 2005/0088999 A1 | 4/2005 | Waylett |
| 2005/0114713 A1 | 5/2005 | Beckman |
| 2005/0120213 A1 | 6/2005 | Winget et al. |
| 2005/0165953 A1 | 7/2005 | Oba |
| 2005/0188211 A1 | 8/2005 | Scott |
| 2006/0067272 A1 | 3/2006 | Wang |
| 2006/0171537 A1 | 8/2006 | Enright |
| 2006/0195893 A1 | 8/2006 | Caceres et al. |
| 2006/0200681 A1 | 9/2006 | Kato |
| 2006/0224518 A1 | 10/2006 | Khusial et al. |
| 2006/0288406 A1 | 12/2006 | Kuhn et al. |
| 2007/0101418 A1 | 5/2007 | Wood et al. |
| 2007/0208936 A1 | 9/2007 | Ramos Robles |

FOREIGN PATENT DOCUMENTS

| | | |
|---|---|---|
| WO | WO 03038578 | 5/2003 |

OTHER PUBLICATIONS

Matsunaga, et al., "Secure Authentication System for Public WLAN Roaming," downloaded from http://portal.acm.org/citation.cfm?id=941343&jmp=references&dl=portal&dl=ACM, dated 2003, pp. 113-121.

Asokan, et al., "Man-in-the-Middle in Tunnelled Authentication," downloaded from http://www.saunalahti.fi/~asokan/research/tunnel.pdf; dated Oct. 24, 2002, pp. 1-13.

Non-final Office Action dated Mar. 10, 2010 in U.S. Appl. No. 11/704,844.

Final Office Action dated Aug. 3, 2010 in U.S. Appl. No. 11/704,844.

Aboba, et al., "PPP EAP TLS Authentication Protocol", RFC 2716, Oct. 1999, p. 1-24.

Dierks et al., "The TLS Protocol Version 1.0", RFC 2246, Jan. 1999, p. 1-80.

Blunk et al., "PPP Extensible Authentication Protocol (EAP)", RFC 2284, Mar. 1998, p. 1-15.

Anderson et al., "Protected EAP Protocol (PEAP)", PPPEXT Working Group, Sep. 2002, p. 1-42.

Hess et al., "Advanced Client/Server Authentication in TLS," Network and Distributed System Security Symposium, San Diego, CA, Feb. 2002 12 pages.

Matt Powell, "WS-Security Authentication and Digital Signatures with Web Services Enhancements," Dec. 2002, Microsoft Corporation, pp. 1-26.

Haller et al., "One-Time Password System," Feb. 1998, RFC Working Group, pp. 1-24.

Simpson W., "PPP Challenge Handshake Authentication Protocol (CHAP)", Aug. 1996, RFC Working Group, pp. 1-13.

Salgarelli et al., "EAP-Shared Key Exchange (EAP-SKE): A Scheme for Authentication and Dynamic Key Exchange in 801.1X Networks", Apr. 30, 2002, pp. 2-3, 8-10 and 17-18.

U.S. Appl. No. 10/804,591, May 7, 2007, Office Action.
U.S. Appl. No. 10/804,591, Mar. 14, 2008, Office Action.
U.S. Appl. No. 10/804,591, Sep. 2, 2008, Office Action.
U.S. Appl. No. 10/804,591, Mar. 17, 2009, Notice of Allowance.

* cited by examiner

GENERIC FRAMEWORK FOR EAP

BACKGROUND

Frequently in computer systems, access to some resource, such as a network or files stored on the network, is restricted to authorized entities. For example, resources may be made available only to authorized users or from authorized devices. Accordingly, before access to a resource is provided, an entity seeking access may be authenticated.

Authentication may be performed according to a protocol that uses a set of credentials. As part of the protocol, a device may exchange credentials with some authentication mechanism that, if proper credentials are provided according to the protocol, can enable the device to access a resource. An authentication mechanism may be, for example, an access control server.

Many different types of authentication protocols are available, and each type may use different credentials or different types of credentials. To facilitate the exchange of credential information, authorization components in the software in both the device and the authentication mechanism may communicate. To account for the wide range of possible protocols, many computing devices incorporate an authentication framework that accepts methods, each of which, when invoked, can execute an authorization protocol. A widely used authentication framework is the Extensible Authentication Protocol (EAP).

EAP is an Internet Engineering Task Force (IETF) standard that provides a framework for network access clients and authentication servers to host plug-in modules, or EAP methods, for many authentication methods and technologies. EAP, which was originally created as an extension to Point-to-Point Protocol (PPP), is highly flexible and supports arbitrary network access authentication methods. EAP is used for IEEE 802.1x specification-based (enterprise) network access to authenticate network access server (NAS) devices such as Ethernet switches and wireless access points (AP). With EAP authentication protocols such as Challenge Handshake Authentication Protocol (CHAP), Microsoft Challenge Handshake Authentication Protocol (MS-CHAP), and MS-CHAP version 2 (MS-CHAPv2), a specific authentication mechanism is chosen during the link establishment phase. During the authentication phase, the negotiated authentication protocol allows the exchange of credential information.

The exact authentication scheme to be used is negotiated by the network access client and the authentication server (e.g., the Remote Authentication Dial-In User Service (RADIUS) server). A connecting client that associates with an access point cannot gain access to the network until the user performs a network logon. After association, the client and the authentication server may exchange EAP messages to perform mutual authentication, with the client verifying the authentication server credentials, and vice versa.

Currently, various EAP methods use different set of credentials to authenticate with the authentication server (e.g., a backend RADIUS server). Acquiring these credentials from the user or a device and using them for authentication is specific to each EAP method and is handled completely inside the EAP method.

Authentication may be performed in different forms, one of which is a Single Sign-on (SSO) that enables a user to authenticate once and gain access to one or more local machines, multiple network software systems, applications, and other resources.

SUMMARY OF INVENTION

A device may be provided with a generic authentication framework. According to the framework, an authentication component, such as an EAP method, can describe, using a credential interface, credentials that it needs to execute an authentication protocol. The credential description is independent of a specific EAP method and the framework can be extended to any authentication component that supports the credential interface.

By using the credential interface, applications can manage credentials by receiving credential descriptions and then collecting credentials from a user, from memory, from a device, or any other suitable location. The application may collect credentials from a user by creating a user interface, which may be built by the application based on the credential description. Because the user interface is built by the application, a user experience around providing credentials may be improved by using context information from within the application when, credentials are requested.

Because the acquisition of credentials is decoupled from the EAP method, an application can implement such scenarios as, for example, a Single Sign-on experience and credential based device authentication. Furthermore, network authentication may precede user or device logon, which may allow implementing processes requiring network access (e.g., running logon scripts, updating group policy objects, etc.).

In one aspect, the invention provides a computer-readable medium having computer-executable components comprising an application component that obtains credential information for an entity, such as a user or a device, and an EAP component, separate from the application component, that performs a method for authenticating the entity using the credential information.

In another aspect, the invention provides a process of operating a client device to authenticate an entity. According to the process, parameters defining credentials are obtained from a first component. The process also includes obtaining, with a second component, credential information consistent with the parameters, providing the credential information to the first component, and interacting between the first component and an authenticator external to the client device using the credential information.

In yet another aspect, the invention provides a process of communicating between an application and an EAP method executed in a device. The process includes making a request from the application to receive credential parameters. The EAP method provides credential parameters in response to the request.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a user experience can be improved by decoupling acquisition and use of credentials, which also allows unifying credential management for different authentication methods. The inventors have further appreciated that by providing a mechanism to manage credentials independently of an authentication method, more functionality may be obtained for authentication purposes. For example, a Single Sign-on (SSO) tool may be readily implemented to collect user credentials for multiple logons, which may simplify a user experience, such as may occur in an enterprise setting in which a user typically is authenticated to establish network connectivity and to logon to a specific computing device. Furthermore, the framework may provide device authentication when the user may or may not be present, allowing a device to logon to a network before a user logs on to the device.

Such a framework may be implemented with an interface comprising an application component (e.g., software application) and an authentication component, separate from the application component. The interface may be implemented as two application programming interfaces (APIs), wherein a first application programming interface may provide a credential definition from the authentication component to the application component and a second application programming interface may provide credential information from the application component to the authentication component.

The credential definition may be obtained, for example, in a form of credential parameters, or in any other suitable form. The application component may obtain credential information consistent with the credential definition from a user or a device. The credential information may be obtained through a user interface such as, for example, a user interface enabling a SSO experience, whereby the user may need to enter a single set of credentials for network access and user logon. Alternatively, the credential information may be obtained from the device.

The collected credential information may then be provided to the authentication component to perform authentication. As an option, the credential information may be stored for future use.

Figure 1:
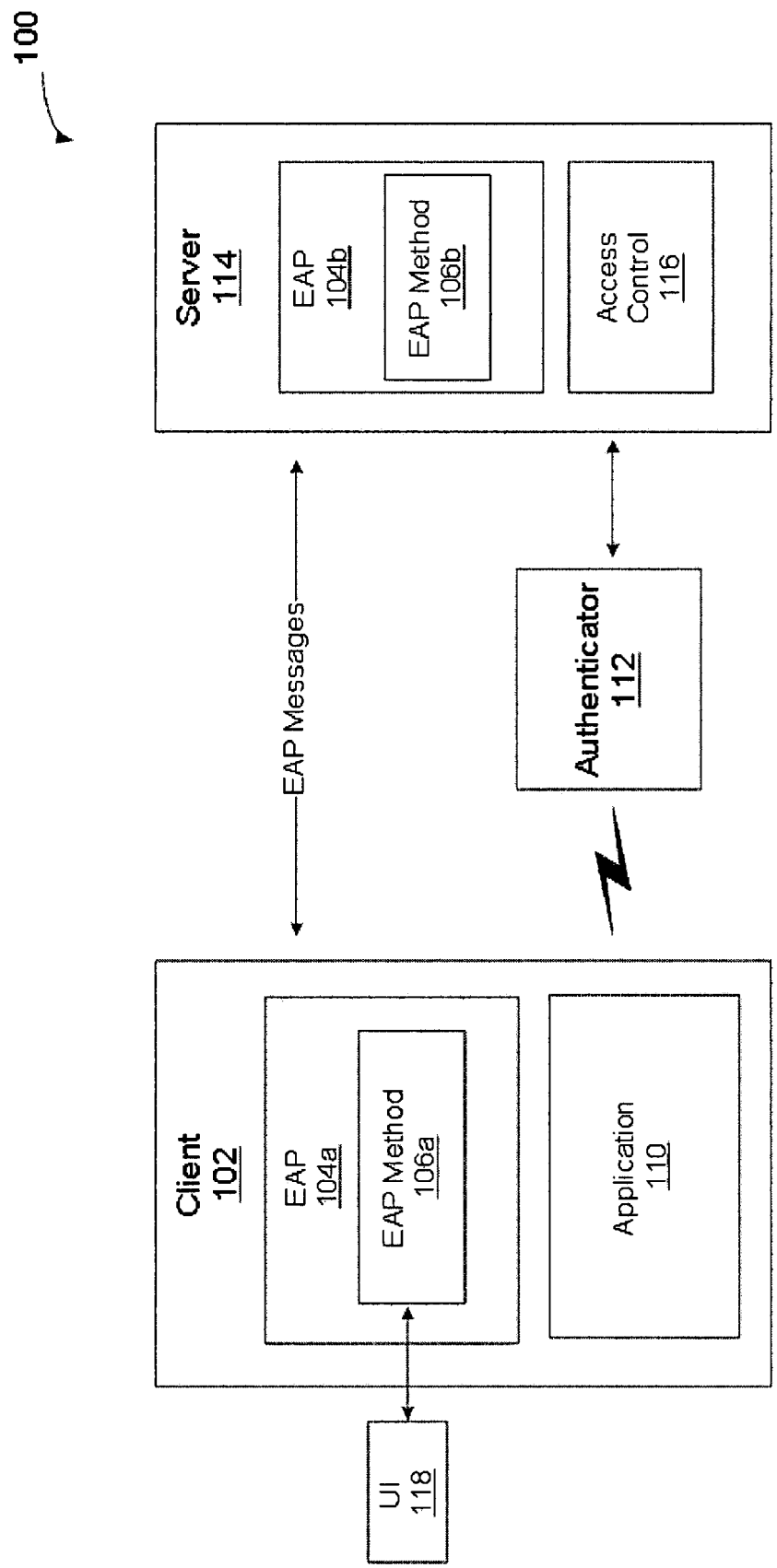
FIG. 1 is a block diagram illustrating architecture of a prior art EAP framework.

FIG. 1 is a schematic diagram of an EAP framework 100. A client, or an EAP peer, 102 is a network access client that may be attempting to access a wireless or wired network. Authenticator 112 may be an access point (AP) or a network access server (NAS) that require EAP authentication prior to granting access to the network. An authentication server 114 may be a server that negotiates the use of a specific EAP method with the client 102, validates the clients' credentials (e.g., user name and password), and authorizes access to the network.

The client 102 comprises an EAP host 104a including an EAP method 106a and an application 110. In the example illustrated, the application 110 may be supplicant software for an IEEE 802.1x-based enterprise wireless network or other software that requires access to a resource for which authentication is required.

EAP host 104a may be a set of internal components that provide architectural support for one or more EAP methods in the form of plug-in modules. For successful authentication, both the client and authentication server typically need to have EAP authentication modules installed that interact to perform authentication according to a desired protocol. Therefore, the EAP method 106a installed on the client 102 may be designed to interact with EAP method 106b installed on the authentication server 114 to perform a desired authentication protocol.

The EAP method 106a is schematically shown to be coupled to a user interface 118 for collecting credentials from users and/or devices. The coupling is shown to demonstrate that the EAP method is responsible for both collecting and managing the credentials. It should be appreciated that client 102 may comprise other suitable components that are not illustrated in FIG. 1.

The server 114 may comprise EAP host 104b including EAP method 106b and an access control component 116. A common access control protocol utilized by the IEEE 802.1x security standard is a Remote Authentication Dial-In User Service (RADUIS). The RADIUS is an Authentication, Authorization, and Accounting (AAA) protocol and is often used for authentication of users and/or applications and for securing access to services in wireless networks. Access control component 116 may implement RADIUS or other access control protocols. It should be appreciated that sever 114 may comprise other suitable components.

An authenticator 112 may rely on a centralized AAA server (e.g., RADUIS server), to authenticate clients. In this case, logical communication of EAP messages is provided between the EAP method 106a installed on the client 102 and the EAP method 106b installed on the authentication server 114, and authenticator 112 does not need to support any specific EAP method.

EAP is extensible through EAP methods. To add support for a new EAP method, an EAP method library file may be installed on both the client and the authentication server. Thus, though one EAP method is shown in each of client 102 and server 114, any number of methods may be present on a client, depending on the number and types of resources to which that client may gain access and the authentication protocols used for those resources.

Different EAP methods may use different sets of credentials to authenticate with the authentication server. For example, the MS-CHAPv2 authentication protocol uses a user name and password for authenticating to the RADIUS server. In addition, an EAP method may use different credential information at different times, depending on how the method is configured. For example, a method may be configured to use either logon user name and password of the currently logged in user or a different user name/password pair.

Though, not all credentials are in the form of user name and password. For example, the EAP-Transport Layer Security (EAP-TLS) protocol may use a certificate from a smart card or a certificate from a disk for authentication purposes. Accordingly, methods exist that use a variety of types of credentials from a variety of sources.

Acquiring the credentials from a user or a device and using them for authentication is typically specific to each EAP method and is handled completely inside the EAP method. This may complicate building generic software solutions that unify credential management for different EAP methods.

Figure 2:
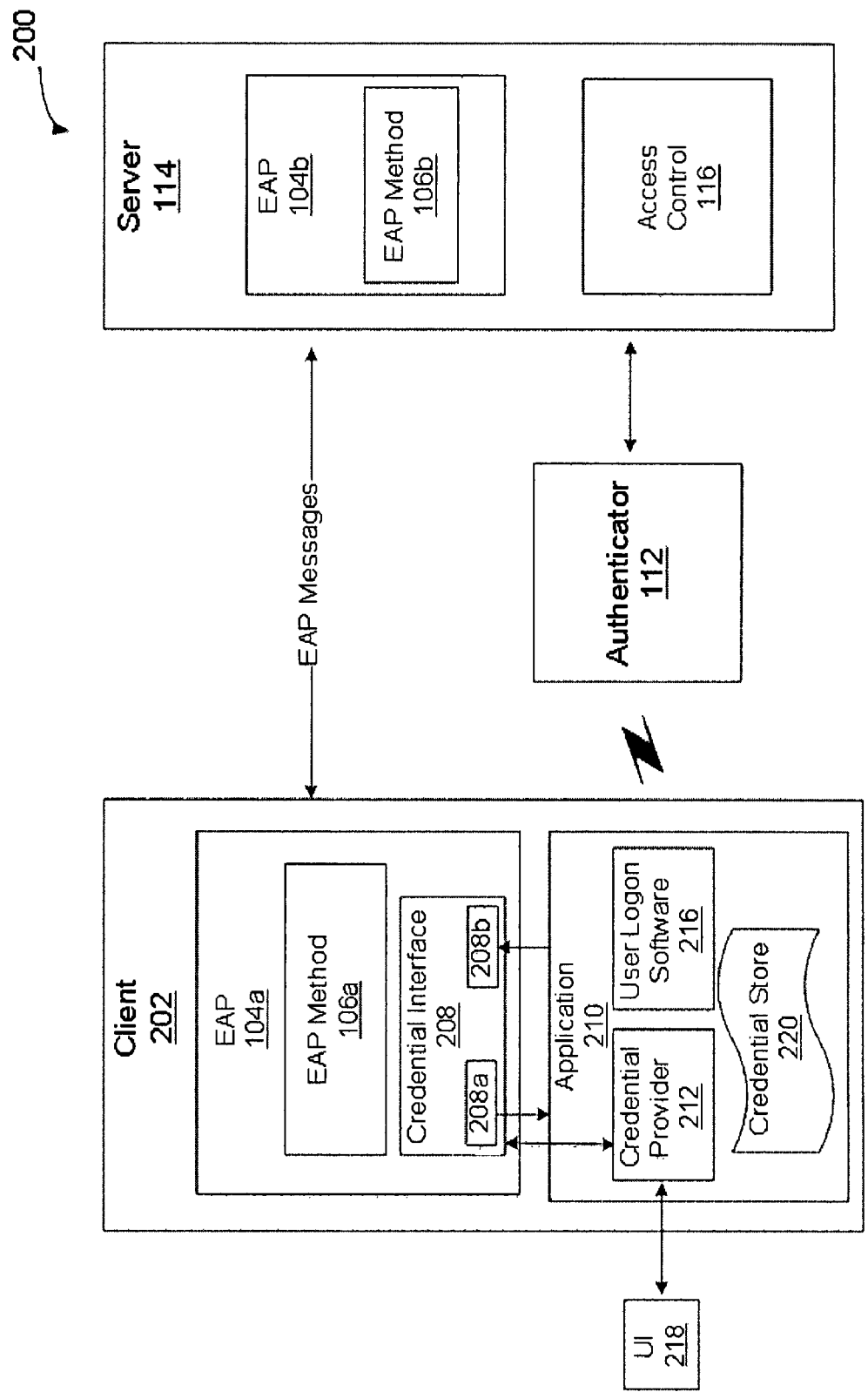
FIG. 2 is a block diagram illustrating architecture of an exemplary embodiment of an authentication framework according to the invention.

FIG. 2 is a block diagram illustrating architecture of an authentication framework 200 according to embodiments of the invention. The framework 200 includes a network access client 202, an authenticator 112 which may be, for example, an AP or a NAS, and an authentication server 114. Embodiments of the invention may be directed to clients accessing IEEE 802.1x-based enterprise wireless networks that may support one or more different EAP methods for authenticating to backend RADIUS servers. Embodiments may also be directed to other media utilizing EAP-based authentication, such as, for example, Ethernet 802.1x-based networks, virtual private networks (VPN), dial-up networking, and EAP over user datagram protocol (UDP). However, because the framework is generic, neither the access control protocol nor the authentication protocol used is a limitation on the invention, and the framework may be used in any suitable computing environment.

In the embodiment illustrated, client 202 and authentication server 114 include respective EAP hosts 104a and 104b that may have EAP method 106a and EAP method 106b installed, respectively. The authentication server 114 includes an access control component 116.

In some embodiments, the client 202 may deploy the Microsoft® Windows® Vista™ operating system. The authentication server 114 may deploy the Microsoft® Windows® Server® software which may host RADIUS as an access control protocol. The EAP hosts 104a and 104b may comprise EAPHost architecture of the Windows® Vista™ and Windows® Server® software, which provides third-party vendors with extensibility opportunities to develop and distribute different EAP methods. However, the specific software used for implementing the components of the authentication framework are not critical to the invention and any suitable components may be used and any of the components described herein may be implemented in any suitable programming language.

To facilitate separating the acquisition of credentials from performing authentication using credentials, the EAP method 106a may expose a credential interface 108 through which the EAP method 106a may describe the credentials that it needs to execute an authentication protocol. Any EAP method that can support such an interface may potentially utilize the framework 200. The credential interface 208 may return a description of the credentials using credential parameters or other suitable representation. In some embodiments, credential parameters are represented as an array of so-called "credential specifiers," where each credential specifier may describe a credential needed for authentication.

In some embodiments, each call to credential interface 108 may result in the EAP method 106a returning the same credential specifiers. However, in some embodiments, an EAP method may be configurable and may require different credentials in different configurations. The credential interface 208 may take as an argument a configuration parameter. Such a parameter provides the EAP method with the ability to change the description of credentials that it needs based on the configuration of the EAP method.

In the embodiment illustrated, credential interface 208 may be implemented as two application programming interfaces (APIs). One API, 208a, may act as a provisioning interface which, when called by an application, returns a description of credentials EAP method 106a uses for executing an authentication protocol. A second API, 208b, may receive those credentials and when called may cause the EAP method 106a to execute the authentication protocol using those credentials. Each API may be coded in the C programming language. However, credential interface 208 may be implemented in any suitable way using any suitable programming language.

Application software 210 in some embodiments may be any software that requires access to a resource for which authentication is required. However, it is not necessary that application 210 access such a resource and may be any component or components that manage credentials. Application software 210 may be operating system software or may be client software. In embodiments that include Windows® Vista™ operating system clients, an application 210 may be client software and may be referred to as a supplicant. Client 202 may be referred to as a supplicant as well.

Application 210 may pass authentication requests to EAP host 104a, which may then be carried out by an EAP method installed in client 202. It should be appreciated that application 210 may run side-by-side with EAP methods (e.g., EAPHost in Windows® Vista™) and may use EAP host 104a and one or more EAP methods.

Application 210 may in turn include one or more components that perform authentication functions or functions for which authentication is required. For example, application 210 may include user logon software 216, such as Winlogon in Windows® Vista™ operating system. User logon software 216 may interact with EAP method 106a to request credential description and provide other credential collection and management functionality.

The application may also include a credential provider 212 that may obtain credentials in accordance with the credential description provided by EAP method 106a. Credential provider 212 may obtain credentials in any suitable way. Credentials may be obtained from users, from credential store 220 or otherwise obtained from the computing device on which client 202 is implemented.

Credential provider 212 may be implemented in any suitable way. For example, it may be implemented as a plug-in module that may define a user interface 218 to gather credentials. The user interface 218 may be a GUI, a command line interface, or any other suitable interface.

Credential provider 212 may be coupled to credential interface 208 so that credentials obtained may be provided to an EAP method.

Once collected, the credentials may also be retained for future use. The collected credentials may optionally be stored for future use in a credential store 220. Credential information may be stored in an encrypted format or otherwise stored in a secure fashion. If credential information is stored, it may be updated by application 210 whenever application 210 detects change in that information, such as may occur when a password expires.

Though a single credential provider is shown, multiple credential providers (e.g., a user name and password credential provider and a smart card credential provider), which can be user-selected and/or event-driven, may be installed on the client to obtain different types of credentials or credentials in different contexts. For example, user interface 218 may appear differently when application 210 is collecting credentials when a user first establishes a connection to a network than when the user reestablishes a connection that was interrupted during a session. It should be appreciated that embodiments of the invention provide a functionality enabling independent software components to create appropriate user interfaces for acquiring credentials from the user or to obtain the credentials in any other suitable way from any other suitable source.

Application 210 may be any software component that may require authentication at any time. However, in many enterprise settings, a client is given access to resources when a user of a client device is authenticated. Frequently, authentication is based on a user name and password. In many instances the client device is programmed to be "locked" until an authorized user logs on by providing an appropriate user name and password. Accordingly, FIG. 2 illustrates that application 210 may include logon software to control the logon process so that a user may be authenticated.

In embodiments implemented on Windows® Vista™ operating system, user logon software implemented as Winlogon communicates with LogonUI which, using credential providers, draws user interface 218 on a display or other output device associated with the device on which client 202 is implemented. In FIG. 2, user interface 218 is shown by way of example only as coupled to credential provider 212. Though FIG. 2 illustrates credentials being obtained through a user interface 218, credential provider 212 may obtain credentials in any suitable way. For example, credential information may be stored within the device implementing client 202. Alternatively, such a device may be equipped with hardware components that provide credentials. For example, credentials may be in the form of a token, digital certificate, smart card based certificate or any other suitable form and may therefore be obtained from a device that reads a smart card or stores a certificate.

Regardless of the source of credentials, credential provider 212 may use a credential description, such as a credential specifier, provided through credential interface 208, to obtain the appropriate credentials. The credential specifier may include, by way of example and not to be limiting, the following information:

CredentialType
The Credential Type may include but not be limited to one of the types discussed hereinbelow.
   LogonUsername Username used for logging to a device.
   LogonPassword Password used for logging on to a device.
   NetworkUsername Username specifically for network access.
   NetworkPassword Password specifically for network access.
   SmartCardPin Pin for the attached smartcard.
   PreSharedKey Shared Secret.
   GenericToken Token number for a token device owned by the user.
   GenericEdit A specific credential not captured by any of the above.
CredentialName
The Credential Name is a name that may be used to refer to the credential when it is presented to a user for input or other purposes.
CredentialFlags
The Credential Flags may be used to describe different properties of the credential, such as, for example, properties given hereinbelow.
   NonDisplayable specifies that credential consists of sensitive information that should not be displayed in a user interface (e.g., password, SmartCard Pin, etc.).
   NonPersistable specifies that the credential should not be persisted on a disk on any storage device (e.g., Smartcard Pin and others).
   CredentialSize may be used to describe any size restrictions associated with the credential (e.g., maximum or minimum length for the credential).

In embodiments of the invention, the user interface 218 may take credentials as an array of credential name/value pairs at start up or during authentication. The framework 200 may provide a mechanism ensuring that an EAP method can be invoked at any time for authentication purposes if credentials are available and is not limited to operation only at start up or at user logon.

By separating the collection of credential information from execution of an authentication protocol, functions may be performed that facilitate use of client 202. As one example, a Single Sign-on (SSO) function may be implemented. As part of the SSO, a user is prompted for credential information once, even though multiple authentication protocols may be executed, each using a subset of the obtained credentials. For example, in the traditional enterprise setting, a user may log into a device implementing client 202 by providing credential information. A user authentication protocol may be performed to complete the logon process. Subsequently, a second authentication protocol may be performed to authenticate the user to a network. Accordingly, client 202 may include multiple authentication methods, one for authenticating a user at logon and a second for authenticating a user to acquire network access. In some enterprise environments, both user logon and network access are performed using the same user name and password. However, if separate credentials are required for user logon and network access, application 210 may determine the credentials needed by obtaining a credential description from a method performing authentication at user logon and from a method performing authentication as part of obtaining network access. Application 210 may then request through user interface 218, or any other suitable mechanism, that the user provide both sets of credential information as part of a single step.

Even if user logon and network access use the same credential information, separating the acquisition of credential information from the use of the credential information may simplify the burden of the user of providing that information. For example, if the credential information provided at logon is incorrect or changes and therefore needs to be reentered, application 210, because it manages the collection of credential information, can determine that the credential information for network access has also changed and supply the appropriately changed credential information to the method obtaining network access.

This capability allows framework 200 to support an SSO experience. SSO is a tool that has been developed to simplify and streamline user logon, whereby a user may be required to provide user authentication information once to access multiple applications, devices, and systems. With such a tool, a user may enter credential information once for network connectivity and user and/or device logon. Though, the SSO experience is not limited to just the functions and may be used with any other desired combination of authentication functions.

Figure 3:
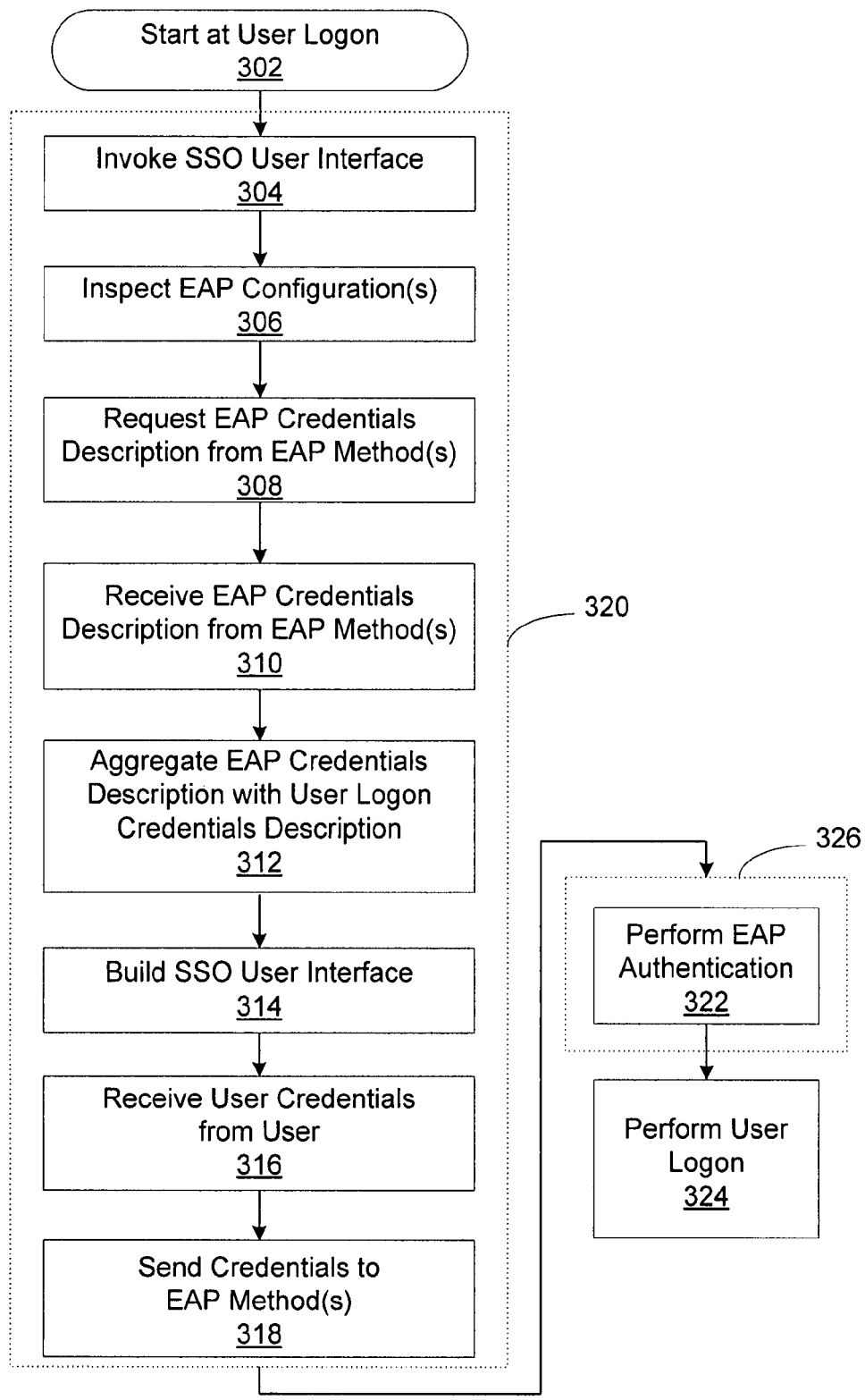
FIG. 3 is a flowchart illustrating credential collection and provisioning implementing a Single Sign-on that may be implemented using the framework of FIG. 2.

FIG. 3 is a flowchart illustrating steps in a process of operating a credential collection framework according to embodiments of the invention that may implement an SSO process. In the example illustrated, subprocess 320 comprises steps performed within user logon software 216, and a subprocess 326 includes actions performed by an EAP method.

In embodiments of the invention, an SSO component may capture credentials through user input via user interface 218 at the time of user logon. The captured credentials may then be used to establish network connectivity based on a subset of these credentials. Another subset of these credentials may be utilized for user logon.

Referring to FIG. 3, the SSO process starts, in this example, at a user logon at a step 302. As one example, user logon may start when a user types a specific key sequence or the device implementing client 202 is powered on. At logon, user logon software 216 may invoke the SSO, component based on any suitable criterion, in a step 304. For example, user logon software 216 may be invoked when a user needs to perform a first time logon to a domain joined machine (in which case no stored credentials may be available) and connect to a network (e.g., the 802.1x network). It should be appreciated that user logon software 216 may be any suitable user logon software.

In a step 306, user logon software 216 may inspect a configuration of an EAP method to be used to connect to the network or other EAP methods that may be used for logon. Using the framework 200, the credential management software 212 may request, in a step 308, that the EAP methods describe the credentials needed to authenticate the client. Similar calls may be placed to other EAP methods that may execute authentication protocols with the network. Such requests may be made by one or more calls through credential interface 208.

In response to the request made in step 308, the descriptions of the credentials may be received in a step 310. The user logon software 216 may then aggregate the descriptions of the EAP credentials needed for the network access with the user logon credentials needed to logon the user, in a step 312 to create a credential set. The same credential set may be used for both user logon and network connectivity or subsets may be used for each function, depending on the specific EAP methods used.

The credential description provided by the EAP method may enable user logon software 216, using one or more credential providers (e.g., credential provider 212), to build a dynamic user interface (e.g., user interface 218) prompting the user to enter credentials consistent with the description of the credentials parameters, in a step 314. In a step 316, the required credentials entered by the user may be received. A subset of these credentials may be supplied to the EAP method as credential name/value pairs using the credential interface (e.g., credential interface 208) exposed by the EAP method, in a step 318. It should be appreciated that a single set of credentials may be required to authenticate network access and user logon. Alternatively, two separate sets of credentials may be required for network access authentication and user logon.

Upon receiving the required credentials, the EAP method 106 may perform an authentication using these credentials, in a step 322. At step 324, a subset of these credentials may be provided to another authentication component, whether another EAP method, or a logon software that takes steps necessary for user logon to one or more devices, machines, domains, or other entities.

Though credentials may be obtained at logon, there may be instances in which network connectivity is desired even with no user logged on. Therefore, embodiments of the invention may allow network connectivity be established before user logon. This feature may be useful for processes occurring at logon time (e.g., running logon scripts, including but not limited to group policy logon scripts, updating group policy objects, maintaining roaming user profiles, and other). Though, credentials may be obtained other than from a user.

In situations where there is no user logged on to a device and/or machine and if the device and/or machine does not support the concept of a logon (e.g. phones), an EAP method may try to use credentials associated with the device and/or machine. However, such credentials may not be available in all deployments. For example, a machine not joined to a domain or an unprogrammed smartphone may not have the right certificate to authenticate to the network. As a result, it might not be possible for the device and/or machine to obtain network connectivity in such deployments.

The framework 200 provided by embodiments of the invention allows decoupling credentials acquisition from the EAP method, thus permitting a software application (e.g., user logon software 216) to gather credentials required by the EAP method and then use these credentials to establish network connectivity. Network connectivity can be established regardless of a presence of a user on the device and/or machine or provisioning of a machine through joining to a domain.

Figure 4:
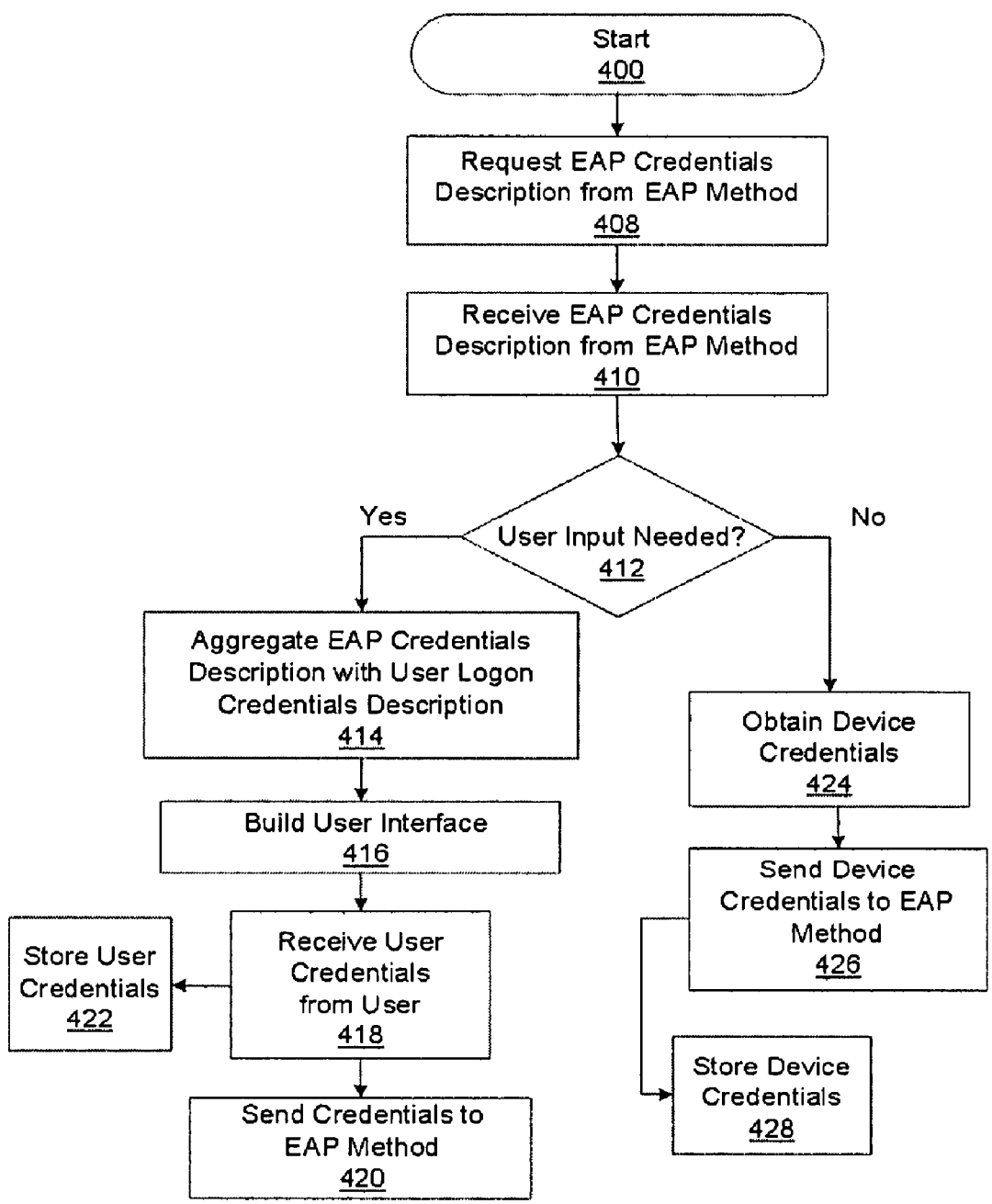
FIG. 4 is flowchart illustrating steps performed by an application for credential collection and provisioning implementing a Single Sign-on according to embodiments of the invention.

FIG. 4 is a flowchart illustrating steps performed by an application for credential collection and provisioning implementing or device authentication according to embodiments of the invention. It should be appreciated that the application may be logon software that is a portion of application 210 or any other suitable application. In the embodiment illustrated, device logon may be performed even without user input or express user logon.

Logon software may be invoked either explicitly by the user or through a trigger (e.g. when an EAP method configuration indicates that credentials need to be provided by the user), in a step 400. Logon software may inspect the configuration to be used to connect to the network.

Using the framework 200, in a step 408, logon software may request the EAP method describe the credentials needed to authenticate with the network using this EAP method. In response, the EAP method may provide the EAP credential description, possible through credential interface 208 so that user logon software 216 will receive the description from the EAP method, in a step 410.

In a step 412, it may be determined whether user input is needed. If the answer is affirmative, the description of credentials needed to authenticate network access may optionally be aggregated with the user logon credentials description, in a step 414. The credentials description provided by the EAP method enables user logon software to draw a dynamic user interface (e.g., user interface 218), prompting the user to enter credentials consistent with the credentials description, in a step 416. The user credentials may then be received from the user in a step 418. The received credentials may be supplied to the EAP method as credential name/value pairs using the credential interface 208 exposed by the EAP method, in a step 418. Following this, the credentials are sent to the EAP method, in a step 420. The credentials may optionally be stored in credential store 220.

If in step 412 it is determined that the user input is not needed, the device credentials or other stored credentials may be obtained, in a step 424. The device credentials or other stored credentials may then be sent, in a step 426, to the EAP method for the authentication performed by the EAP method using these credentials. The device credentials or other stored credentials, along with the EAP method configuration, may optionally be stored in an appropriate machine/device-wide store (e.g., credential store 220) for subsequent connectivity, which is shown in a step 428.

Figure 5A:
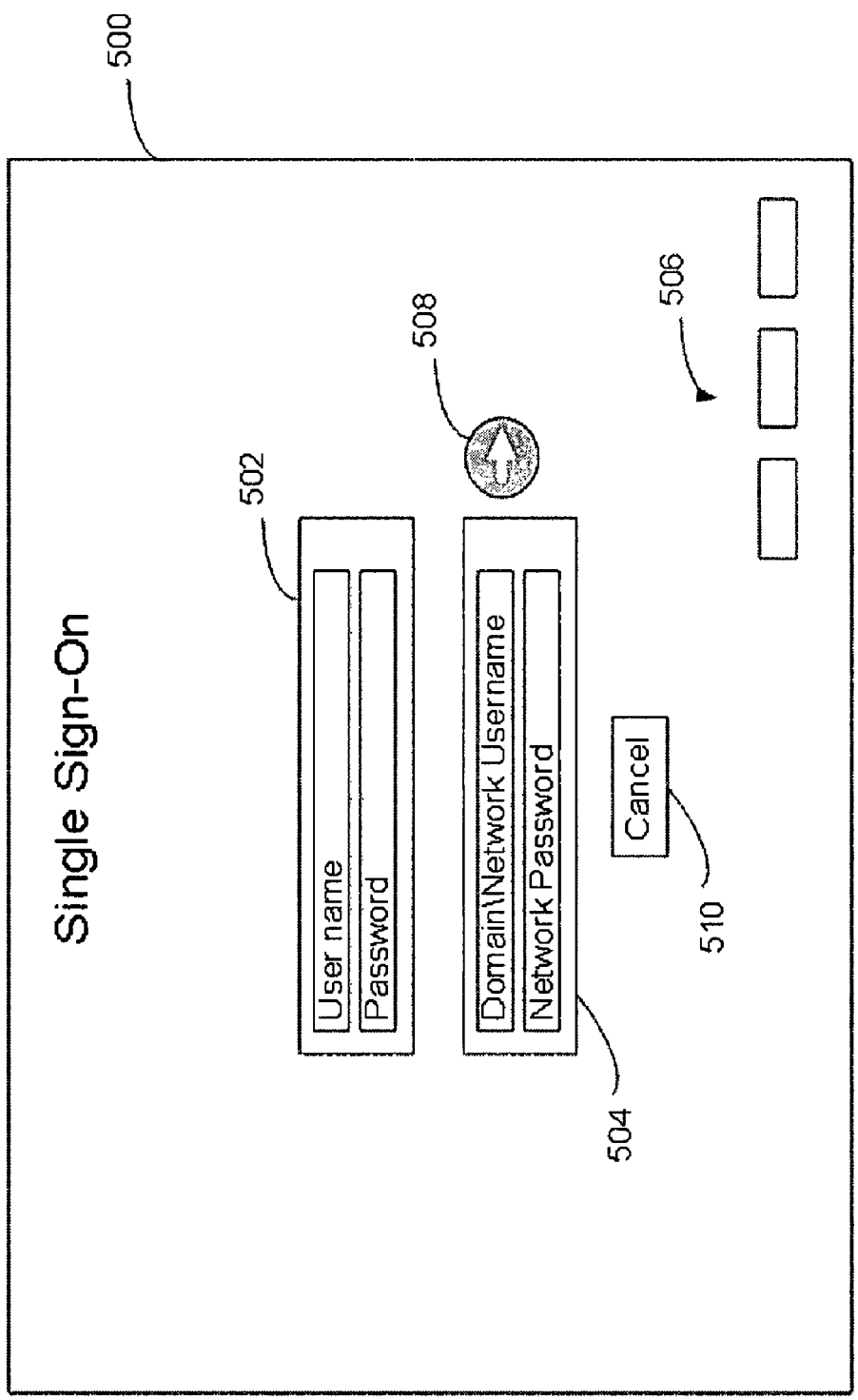
FIG. 5A is a schematic diagram illustrating a user interface displaying a Single Sign-on with separate sets of credential providers for user logon and network access that may be implemented using the framework of FIG. 2.

FIG. 5A is a schematic diagram illustrating a user interface 500 providing SSO with separate sets of credential providers for user logon and network access. The user logon may be managed by user logon software 216 or any other suitable component of client software. Additional interactive user interfaces that are required for the logon process may be drawn. For example, when a user has to change a password, either on a first time user logon or on an expired password, interactive user interfaces may be provided.

FIG. 5A illustrates that a graphical user interface that may provide a single-sign-on experience when network authentication and user logon use different authentication methods requiring different credentials. Thus, a credential input area 502 comprising user name and password may be required to login the user and a credential input area 504 comprising network username and password may be required for network authentication. Embodiments of the invention may enable an SSO tool to build an interface through which the user is prompted once for both sets of credentials for network authentication and for user logon. A "cancel" button 510 and a "go" button 508, as well as additional buttons and indicator 506 (e.g., "switch user," progress bar, etc.) may be provided to facilitate user interaction with the SSO interface. In the embodiment illustrated, the SSO interface of FIG. 5A may be built by operating system software. However, it should be appreciated that embodiments of the invention may allow for addition of third party network authentication methods that provide the SSO experience.

Figure 5B:
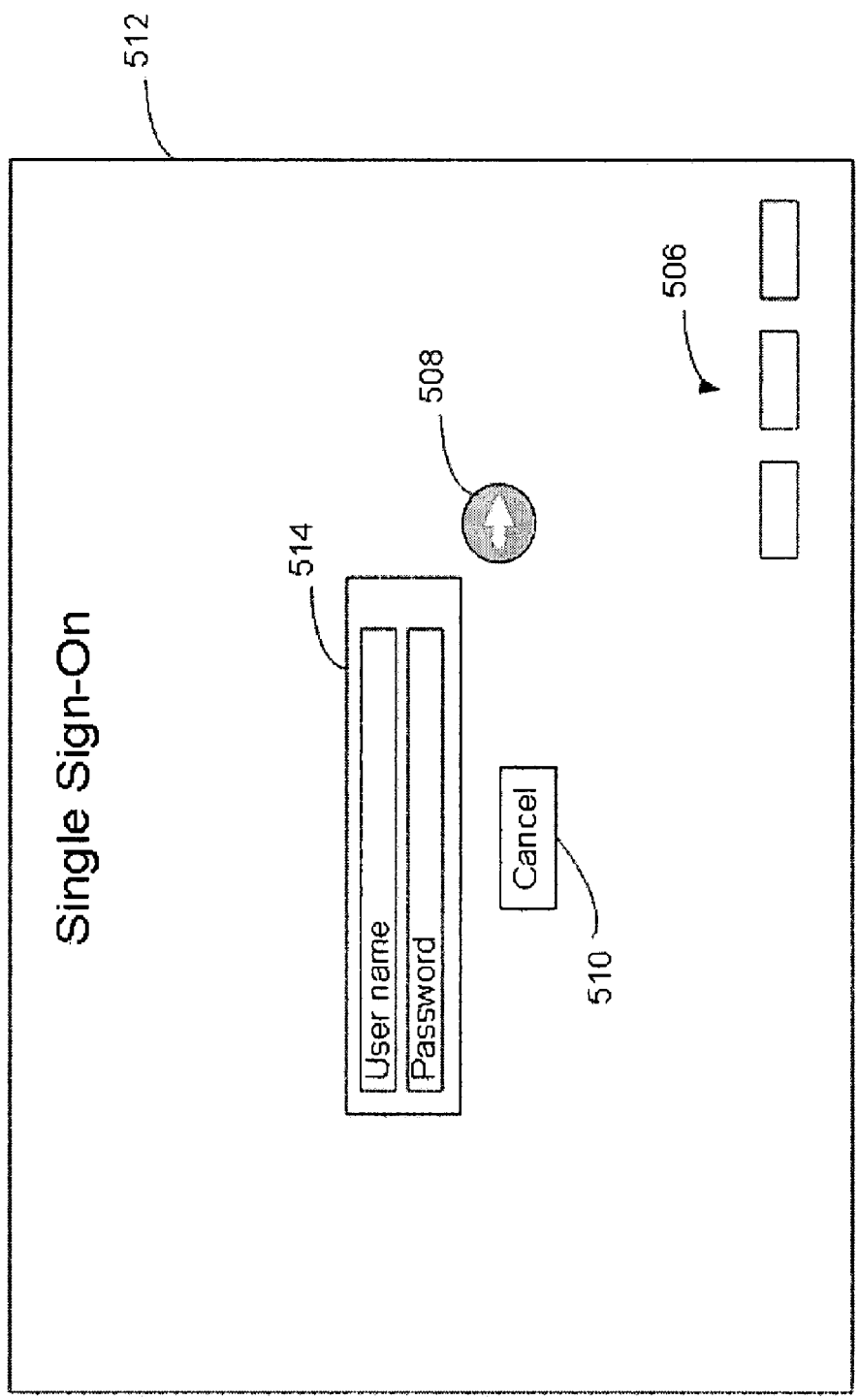
FIG. 5B is a schematic diagram illustrating a user interface displaying a Single Sign-on with a single set of credential providers for user logon and network access that may be implemented using the framework of FIG. 2.

As another example, FIG. 5B illustrates a user interface 512 which prompts the user to enter a single credential set 514. Such an embodiment may be used when a single set of credentials is used for multiple purposes. If network authentication is required, the set of credentials 514 may be used for both user logon and network authentication. The network authentication may not be required, in which case the credential set 514 is provided to collect user logon credentials only.

In summary, embodiments of the invention provide the framework that decouples credential collection from an EAP method by providing the unifying credential description mechanism. The framework provides an interface which allows acquiring credential description from an authentication method needed by this method to perform authentication, collecting credentials consistent with the description, and providing the collected credentials to the authentication method. The framework also enables the SSO that may provide network connectivity at the time of user logon, which may be established using single set of credentials required for network connectivity and user logon. The SSO tool may simplify user experience. Furthermore, the framework allows device authentication when user may or may not be present.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable storage medium having computer-executable components for execution on a client device, the computer-executable components comprising:
   an authentication component, comprising a first Extensible Authentication Protocol (EAP) component located on the client device, that, when executed, authenticates with an authenticator that is external to the client device using first credential information; and
   an application component, located on the client device, that, when executed, receives a description of the first credential information from the authentication component, builds a user interface, and obtains the first credential information through the user interface for an entity in accordance with the description and provides the obtained first credential information to the authentication component;
   a second EAP component that, when executed, performs a method of authenticating the entity using second credential information entered through the user interface which prompts the entity to enter the credential information and the second credential information;
   wherein:
   the authentication component is separate from the application component and authenticates with the authenticator by performing a method for authenticating the entity to the authenticator that is external to the client device using at least the first credential information.

2. The computer-readable storage medium of claim 1, wherein the entity is a device and the application component, when executed, obtains device credential information.

3. The computer-readable storage medium of claim 1, wherein the entity is a user.

4. The computer-readable medium storage of claim 1, wherein the computer-executable components comprise a first application programming interface and a second application programming interface, the first application programming interface providing a credential definition from the authentication component to the application component and the second application programming interface providing at least the first credential information from the application component to the authentication component.

5. The computer-readable storage medium of claim 4, wherein the application component comprises a portion of an operating system that, when executed, performs a user logon function.

6. A method of operating a client device to authenticate an entity, comprising:
   obtaining from a first component of the client device a description of credentials;
   building a user interface through which a user may enter credential information;
   obtaining, with a second component of the client device, credential information consistent with the description, the credential information being entered at the user interface;
   providing, by the second component, the credential information to the first component; and
   interacting between the first component and an authenticator external to the client device using the credential information;
   the first component comprising a first Extensible Authentication Protocol (EAP) method; and
   the method further comprising:
   obtaining from a second EAP method a second description of second credentials; and
   obtaining, with the second component, second credential information meeting the second description.

7. The method of claim 6, further comprising: storing, with the first component, the credential information.

8. The method of claim 6, wherein the credential information may be used to perform network access authentication and entity logon, with the network access authentication preceding the user entity.

9. The method of claim 8, wherein the entity is a device.

10. The method of claim 8, wherein the entity is a user.

11. A method of communicating between an application and an Extensible Authentication Protocol (EAP) component in a device, the method comprising the steps of:
   making a request from the application in the device to the EAP component in the device to receive credential parameters;
   providing with the EAP component the credential parameters to the application in response to the request;
   obtaining, with the application, credentials consistent with the credential parameters through a user interface built by the application and which prompts the entity to enter the credential information;
   providing the credentials from the application to the EAP component; and
   accessing with the EAP component an authenticator external to the device using the credentials, wherein:
   the EAP component is a first EAP component; and
   the method further comprises:
   making a second request from the application to receive second credential parameters;
   obtaining, with the application, second credentials consistent with the second credential parameters; and
   making at least one second call from the application, the at least one second call having at least one argument conveying the credentials and the second credentials.

12. The method of claim 11, wherein providing the credentials from the application to the EAP component comprises making at least one call from the application to the EAP component, the at least one call having at least one argument providing the credentials consistent with the credential parameters.

13. The method of claim 12, further comprising: in response to the at least one call, from the EAP component, accessing the authenticator external to the device using the credentials.

14. The method of claim 12, wherein accessing an authenticator external to the device comprises, with the obtained credentials performing network access authentication and device logon, with the network access authentication preceding the device logon.

* * * * *